United States Patent [19]

Hedén

[11] 4,060,010
[45] Nov. 29, 1977

[54] REDUCTION GEAR, ESPECIALLY FOR CAMERA LENS MOTORS

[76] Inventor: Björn Harald Hedén, Stenbrogatan 3 D, S-431 43 Mölndal, Sweden

[21] Appl. No.: 616,538

[22] Filed: Sept. 25, 1975

[30] Foreign Application Priority Data

Sept. 26, 1974 Sweden .................................. 7412124

[51] Int. Cl.$^2$ .......................... F16H 13/06; F16D 7/02
[52] U.S. Cl. ...................................... 74/798; 64/30 C
[58] Field of Search ................ 74/798, 768, 769, 206; 64/30 C

[56] References Cited

U.S. PATENT DOCUMENTS

| | | | |
|---|---|---|---|
| 1,368,570 | 2/1921 | Philippeau | 74/798 |
| 1,986,177 | 1/1935 | Zastoupil | 74/798 |
| 2,348,848 | 5/1944 | Rabl | 74/798 |
| 2,577,081 | 12/1951 | Harshberger | 74/798 |
| 2,578,801 | 12/1951 | Harshberger | 74/798 |
| 3,105,371 | 10/1963 | Forrest | 64/30 C |
| 3,208,316 | 9/1965 | Scribiner | 64/30 C |
| 3,631,742 | 1/1972 | Hoffmeister | 74/798 |

Primary Examiner—Samuel Scott
Assistant Examiner—Allan R. Burke
Attorney, Agent, or Firm—Pollock, Vande Sande & Priddy

[57] ABSTRACT

A camera lens drive comprises a small electric motor and a transmission for driving a lens part. The transmission is formed solely by a number of planetary gear sets arranged in series. The planetary gears are ball bearings having adjustable prestressing. The prestress of a group of input sets is adjustable independently of the prestress of a group of output sets.

6 Claims, 1 Drawing Figure

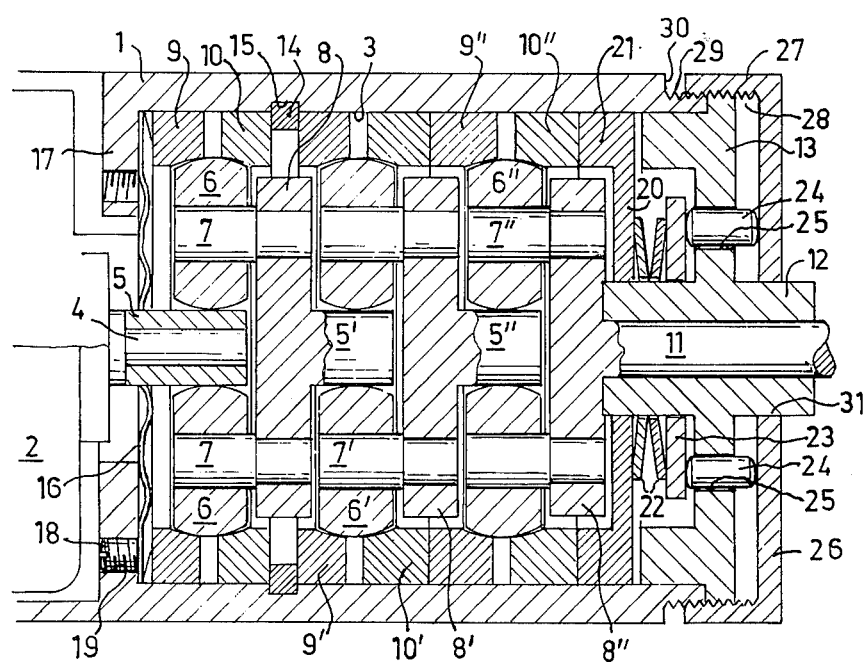

REDUCTION GEAR, ESPECIALLY FOR CAMERA LENS MOTORS

The present invention relates to a transmission for small electric motors, especially for camera lens motors for focal length setting or focussing, comprising an input shaft driven by the motor, an output shaft intended for driving a lens part, a reduction gear situated between the input and the output shaft and an adjustable slip clutch for setting desired maximum torque on the output shaft.

Such transmissions are used, for example, in camera lenses for speed reduction between a miniature electric motor mounted on the lens and a drive ring attached to a lens part so as to impart rotation onto the lens part for focal length setting or focussing of the lens. Exacting demands are placed on transmissions of this type. For example, relatively great speed reduction shall be effected from the small high speed motor and a torque of perhaps merely 12-20 pond centimeters. The reduction gear shall function reliably within a large temperature range due to the fact that it is positioned openly on the lens without any protection. The same applies for the slip clutch which, even after extensive operation, must not transmit torque which is greater than the predetermined torque as the lens parts in question could otherwise be damaged. The transmission shall also allow the lens part in question to be manoeuvred manually when the electric motor is disengaged so that the lens can be manually adjusted when the electric equipment malfunctions. In use together with newer kinds of cameras which are especially sound-insulated and operate very silently, lens setting must also be able to be performed quietly and, thus, the transmission must function quietly. Even if cost is not of primary importance for a transmission of this type, it is naturally in the long run of importance that cost be kept down.

Previously known transmissions of the kind mentioned above have been designed as cog wheel gearings in which adjustable disc clutches are arranged on the output side. These gearings are not able to meet the above-mentioned demands, especially the demand for silent operation. The development of a slip clutch which, during a long period of time and under varying temperature conditions, is able to guarantee a predetermined maximum torque has also been connected with great difficulties and high costs. Attempts have been made to sound-insulate cog wheel transmissions, with the result, however, that they become heavy and bulky. Furthermore, as it is necessary that the entire transmission have small dimensions and be light-weight, attempts have been made to compensate said weight and bulk by using a smaller motor. However, this is a very unfavorable solution as the effect of the motor then becomes insufficient under certain conditions, for example in cold weather.

According to the invention, the above-mentioned problems are solved by means of the transmission being formed of a friction planetary gear having adjustable prestressing. With a suitable choice of material for the friction bodies, such a transmission operates silently and reliably at different temperatures. The friction transmission in itself forms a slip clutch which can be adjusted by means of setting the prestressing. Due to this and to the fact that the transmission in itself forms radial bearings for ingoing and outgoing shafts, the entire transmission is cheaper than a corresponding cog wheel gearing and accompanying slip clutch.

In order to obtain substantial speed reduction, the planetary gear according to a further development of the invention can be built up of two or more gear sets coupled in series. These can be arranged in a row without bearings if the internal gear in each set is non-rotatably arranged in the housing of the transmission and the output shaft of one set which is connected with the planet carrier forms the input shaft of the following set.

When the planetary gear is built up of a plurality of stages coupled in series, the gear sets can, according to a preferred embodiment of the invention, be arranged in two groups, of which one is arranged on the input side of the transmission and the other on the output side thereof. The prestressing of one of the groups is thereby made adjustable independently of the prestressing of the other group. In this manner the prestressing of the input group comprising one or more gear sets can be set for adjustment of the maximum torque load on the input shaft, so that an evenly distributed load on the weak drive motor is achieved. The prestressing of the other group on the output side comprising one or more gear sets can be set independently of the prestressing of the first group, so that the output torque of the transmission is maximized. In this manner overloading of the driven lens part is prevented. If said lens part operates slowly or sluggishly or is jammed due to foreign particles, cold or some other reason, the transmission will slip when the predetermined torque is reached, thereby preventing damage of the lens part.

The planetary gear sets are suitably provided with a non-rotatable, divided outer ring such as, e.g., a ball bearing.

An embodiment of the invention is described in more detail below with reference to the accompanying drawing which, in axial section, shows a three-stage transmission according to the invention.

The transmission has a housing 1 which, in a manner not shown here, is connected to or formed integrally with the housing of the electric drive motor 2. The housing 1 has a cylindrical bore 3 in which the internal gears of the three planetary gear set included in the gear are non-rotatably arranged. They can, however, be axially moved. The drive shaft 4 of the electric motor is provided with a casing 5 which forms a sun gear in the first planetary gear set. The spherically shaped surfaces of planet bodies 6 abut the casing 5, said planet bodies being rotatably mounted on planet shafts 7 which are attached to a planet carrier disc 8. The planet bodies 6 roll outwardly on the outer ring of the planetary gear, said outer ring being divided into two halves 9 and 10. The planet carrier 8 has a central shaft journal 5' which extends in the opposite direction towards the planet shafts 7, said central shaft journal forming the sun gear of the second planetary gear set. Said set, in a manner similar to the first gear set, comprises planet bodies 6' which rotate about planet shafts 7' which are attached to a planet carrier 8'. The outer ring of the second set is also divided into two ring halves 9' and 10'. The planet carrier 8' of the second set has a projecting shaft journal 5" which forms the sun gear of the third planetary gear set comprising planet bodies 6", planet shafts 7", planet carrier 8" and outer ring halves 9" and 10". The planet carrier 8" of the third gear set is connected to the transmission output shaft 11. The shaft 11 is journalled in a bushing 12 which is arranged in an end wall 13 of the transmission housing.

An annular stop 14 is arranged in an annular groove 15 in the bore 3 of the housing 1 between the outer rings of the first and second gear sets. The outer ring halves 10 and 9', which are facing each other in the first and second gear set, each abut a respective side of the annular stop 14. The first gear set is prestressed by means of a cup spring 16 which is journalled between outer ring half 9 and a collar 17 in the gear housing 1, said collar projecting radially into the bore 3. Set screws 18 are arranged in the collar 17 in threaded axial bores 19. The inner ends of said screws abut the cup spring 16. By means of turning the set screws 18, the prestressing of the first gear set can be altered so as to set the desired maximum torque load on the drive shaft 4.

The other two gear sets form a common group on the output side, for which prestressing is commonly adjustable. The outer ring halves 9', 10', 9", 10" of the gear sets are, as is the case with the outer ring halves 9, 10 of the first gear set, movable in the bore 3 but, in a manner not shown here, non-rotatable in the same. A disc 20 is arranged between the outer ring half 10" which is situated closest to the output side and the housing end wall 13, said disc having an axially directed annular collar 21 which is guided in the bore 3, the free end of said collar resting against outer ring half 10". A pair of cup springs 22 are arranged around the shaft bushing 12 on that side of the disc 20 which is facing the end wall 13 and a thrust washer 23 is arranged between the end wall 13 and the cup springs 22. A number of adjustment pins 24 are arranged in the end wall 13, said pins being slidably guided in axial bores 25. The inner ends of the pins 24 abut the thrust washer 23. The outer ends of the pins abut the inside of a cap 26 whose axially directed peripheral flange 27 has inner threads 28 which engage with outer threads 29 on a turned portion 30 of the housing 1 and the end wall 13. The cap 26 has a central bore 31 through which bushing 12 extends. The outer side of the flange 27 has suitably a knurled engagement surface.

Setting of prestressing for the gear sets in the output group can therewith be performed by means of turning the cap 26. In order to increase prestressing, the cap 26 is screwed in so that adjustment pins 24 are forced inwards. In this manner thrust washer 23 is moved to the left, whereby the cup springs 22 are compressed. Said springs then push the disc 20 to the left, whereby the annular collar 21 of the same pushes against the outer ring half 10" which is situated furthest to the right. Said outer ring half 10" forces the planet bodies 6" to the left. The pressure from said bodies is then transmitted to outer ring half 9" which abuts or is an integral unit with the right-hand outer ring half 10' of the immediately preceding planetary gear set. Outer ring half 10' transmits in turn pressure to planet bodies 6' and from the same to the left-hand outer ring half 9' which rests against the annular stop 14 which transmits the prestressing force to the housing 1. The prestressing is reduced by means of unscrewing the cap 26. Thus, with the help of the cap 26, the output torque of the transmission can be set at a maximum value. When the resistance of the lens part which is to be driven exceeds said value, slipping arises in the output set of the transmission. It is also easy, by means of unscrewing the cap 26, to reduce prestressing so much that no torque is transmitted. This is desirable in order to make it possible to manually set the lens part without any interference in the event of malfunction of the electrical system. In order to allow simple conversion between 0 torque setting and setting of maximum desired torque, the flange 27 of the cap 26 and the housing 1 can be provided with, for example, a setting scale and directional arrow.

The invention is not restricted to the embodiment described above and illustrated in the drawing. Within the framework of the following claims, the transmission can be designed in one single gear set. It can also be found to be economically advantageous to use, instead of the above-described planet bodies on the planet carrier, planetary gears designed as rolling body bearing, e.g., ball bearings, the transmission output shaft then being connected with a ball cage or the like engaging between the balls. Sun gears, planets and internal gears are suitably designed as ground and lapped hard metal parts. In the embodiment described above, the springs can alternatively be arranged to abut the annular stop 14. Adjustment of prestressing can also be arranged on the output side with simple set screws in the end wall, as is the case in the input side. Alternatively, the input side can be provided with a common adjustment device corresponding to the one on the output side.

What I claim is:

1. A transmission for a camera lens motor, comprising
   a. a transmission housing;
   b. a motor adjacent to the housing;
   c. an input shaft driven by the motor;
   d. an output shaft for driving a lens part;
   e. a reduction gear means between the input and output shafts;
   f. the reduction gear means comprising at least two friction planetary gear sets arranged axially in series, and divided into first and second groups;
   g. the first said group being arranged on the transmission input side and the second said group on the transmission output side, each of said groups comprising at least one planetary gear set;
   h. variable slip clutch means associated with at least one planetary gear set of said second group and with said output shaft for setting a predetermined maximum torque on said output shaft; and
   i. separate means associated with a planetary gear set of said first group and with said input shaft for setting a predetermined maximum torque on said input shaft, whereby pre-stressing of each of said first and second groups is independently adjustable.

2. A transmission according to claim 1, including a bore in the transmission housing, the axially movable internal gear halves being arranged in the bore, said variable slip clutch means and said separate means each said comprising members axially movable in an end wall of said housing, said members being axially adjustable from the exterior of each said end wall so as to influence the internal gear half located closest to such end wall.

3. A transmission according to claim 2, including a prestressing spring between each of the adjustment members and the associated movable gear half.

4. A transmission according to claim 2, including a disc for collectively adjusting the adjustment members, the disc cooperating with parts of said members which project outside of the respective end wall, said disc forming part of a cap threaded onto the transmission housing, whereby the disc is axially movable for axial advancement of said adjustment members.

5. A transmission according to claim 4, wherein the adjustment members are pins slidably guided in and extending through axial bores in the respective end wall.

6. A transmission according to claim 1, each of said planetary gear sets having an internal gear, a sun gear, a carrier having gears rotatably mounted thereon and coacting with said sun gear and said internal gear, said internal gears being non-rotatably positioned in the transmission housing, the carrier of one planetary gear set forming an input shaft acting as a sun gear of the next succeeding planetary gear set, the internal gear of at least two adjacent planetary gear sets being divided into two halves, the adjacent internal gear halves of two adjacent planetary gear sets belonging to said first and second groups, respectively, being immovable toward each other, the other, non-adjacent internal gear halves of said adjacent planetary gear sets facing away from each other being axially movable independently of each other, under the influence of said variable slip clutch means and said separate means, respectively.

* * * * *